United States Patent Office 2,969,354
Patented Jan. 24, 1961

2,969,354

ALDOHEXOSE NITROUREIDE TETRANITRATE AND SALTS THEREOF

Joseph W. Lawrence and Norman M. Junk, Tamaqua, Pa., assignors to Atlas Powder Company, Wilmington, Del., a corporation of Delaware No Drawing. Filed Dec. 19, 1957, Ser. No. 703,741

12 Claims. (Cl. 260—211.5)

This invention relates to new and useful organic nitrogen compounds and more particularly to nitrated aldohexose ureides and to their metal salts.

An object of the invention is to provide, as novel compounds, tetranitrate esters of aldohexose nitroureides.

Another object of the invention is to provide metal salts of aldohexose nitroureide tetranitrates which are sensitive to detonation and which are useful in the explosives art.

A further object is to provide methods for preparing the said novel esters and salts.

The above and other objects will be apparent in the following description of the invention and in the appended claims.

In accordance with the process of the invention an aldohexose ureide is exhaustively nitrated as, for example, with mixed nitric-sulfuric nitrating acid to form the tetranitrate of the corresponding aldohexose nitroureide and the resulting ester recovered from the nitrating agent. The esters so obtained are acidic in nature and readily form metallic salts. In accordance with the invention the tetranitrate esters are, if desired, converted to salts of inorganic bases, the cations of which have a valency no greater than 2. The compounds of the invention are thus the tetranitrate esters of aldohexose nitroureides such, for example, as glucose nitroureide tetranitrate or mannose nitroureide tetranitrate and salts of the said esters wherein the cation of the salt is inorganic and has a valency no greater than 2. Illustrative mention may be made of the sodium, potassium, ammonium, calcium, silver, copper, magnesium, mercury, zinc and lead salts.

The aldohexose nitroureide tetranitrates are insoluble in nitric-sulfuric nitrating acid and precipitate therefrom as rapidly as formed. They may be readily separated from the spent nitrating medium by diluting with water and filtering. The esters may be purified in conventional manner by extracting with suitable organic liquids and/or by recrystallization from suitable solvents.

Salts of the esters so formed may be prepared by neutralizing the product with suitable inorganic bases or by double decomposition reaction between such neutralized products and inorganic salts. Thus the precipitated aldohexose nitroureide tetranitrate may be dissolved in an oxygenated organic solvent, acetone for example, and neutralized with a suitable basic material. Ammonium, alkali metal and alkaline earth metal salts may be prepared by direct neutralization with the hydroxide or carbonate of the metal (preferably the latter) and recovered by concentration of the solution, crystallization of the desired salt, filtration and drying. The salts may be purified by extraction of the crystals with suitable solvents if desired.

It has been found generally unsatisfactory to prepare the heavy metal salts of the invention by direct neutralization with basic compounds of the metals. Such salts may readily be obtained by first converting the tetranitrate esters to water-soluble alkali metal or ammonium salts and precipitating the desired heavy metal salts from aqueous solution thereof by adding a solution of a salt of the appropriate metal such, for example, as the nitrate, chloride or acetate. The heavy metal salts are soluble in oxygenated organic solvents and may be purified by recrystallization therefrom if desired.

The salts of the invention are crystalline compounds, stable under ordinary conditions of storage, and sensitive to detonation. They have utility in the explosives art, particularly as ingredients in the manufacture of detonators or blasting caps.

For reasons of economy and availability of raw material the preferred compounds of the invention are those prepared from glucose ureide although it is to be understood that salts from the nitration products of other aldohexose ureides, such for example, as mannose ureide or galactose ureide, may be prepared by the technique described above and are equally within the scope of the invention. The said ureides are compounds well known in the art and their preparation is not part of this invention. The formula of a typical aldohexose ureide may be written in condensed form as follows:

In the following illustrative examples there are presented specific embodiments of the invention, which have been described in broad outline above.

Example I

Ten grams of glucose ureide were added slowly to a mixture of 50 grams of nitric acid and 50 grams of sulfuric acid at 0° C. whereupon a white slurry of glucose nitroureide tetranitrate in the spent nitrating acid was obtained. The product was drowned in 600 ml. of an ice-water mixture, filtered and washed with three 500 ml. portions of ice-water. The precipitate was slurried in methylene chloride, allowed to stand for an hour, filtered and dried. The yield was 60% on the theory and the product melted in the range of 133° to 136° C. The material was further purified by crystallization from chloroform to which 1% of acetic acid had been added, yielding a product with a melting point of 143° to 145° C. The nitrogen content of the recrystallized glucose nitroureide tetranitrate was 22.2% (theory, 21.9%).

Example II

Glucose nitroureide tetranitrate prepared as in Example I was dissolved in acetone and treated with an excess of powdered sodium carbonate. The excess carbonate was filtered off and the acetone evaporated to yield the white crystalline sodium salt of glucose nitroureide tetranitrate. Its nitrogen content was found to be 20.4% (theory, 20.8%).

Example III

Ten grams of glucose ureide were added slowly to 70 grams of mixed nitrating acid (50% nitric acid–50% sulfuric acid), keeping the temperature between 0° and 3° C. while stirring constantly. The addition required 15 minutes and stirring was continued for an additional 10 minutes after all the ureide had been introduced. The charge was drowned in 500 ml. of ice-water and the white crystalline precipitate of glucose nitroureide tetranitrate filtered from the diluted spent acid. The precipitate was then dissolved in 50 ml. of acetone and neutralized with 10% aqueous sodium carbonate solution, thus forming the soluble sodium salt of the nitro compound. An excess of lead nitrate in aqueous solution was then added to precipitate the insoluble lead salt of glucose nitroureide tetranitrate. The product was filtered and dried, yielding 19 grams of the sought lead salt.

Example IV

The process of Example III was repeated through the step of dissolving the precipitated and filtered glucose nitroureide tetranitrate in 50 ml. of acetone. To the acetone solution three grams of solid calcium carbonate was added slowly with stirring, converting the nitrated ureide to the calcium salt which was soluble in the acetone. The solution was filtered from suspended solids and a current of air blown over its surface to evaporate the solvent. As the solution became more concentrated the calcium salt of glucose nitroureide tetranitrate crystallized therefrom. After most of the acetone was evaporated the crystals were filtered from the remaining solution and dried, yielding 10 grams of the calcium salt.

Substitution of mannose ureide for glucose ureide as the starting material in the foregoing example leads to the production of the calcium salt of mannose nitroureide tetranitrate.

Example V

Ten grams of glucose ureide were nitrated as in Example III and the crystalline glucose nitroureide tetranitrate recovered from the spent acid by drowning in ice-water and filtering. The solid was added, with stirring to 30 ml. of a 7% aqueous solution of sodium carbonate in which it dissolved to form the soluble sodium salt. Twenty-five ml. of a 28.5% solution of lead nitrate was then added, precipitating the lead salt of glucose nitroureide tetranitrate which was filtered from the excess lead nitrate and other water soluble by-products. The crude salt was purified by dissolving in acetone, filtering off any acetone-insoluble impurities, evaporating most of the acetone to crystallize the dissolved lead salt and filtering the residual acetone solution therefrom. Nine grams of the purified product were thus obtained.

The following examples are illustrative of the use of the salts of the invention as explosive ingredients.

Example VI

Two compound detonators were prepared in 2-inch Gilding metal tubes of 0.22 inch inside diameter, employing as the base charge in each 0.29 gram of pentaerythritol tetranitrate pressed with 150 pounds on a 0.216 inch pin; as a primer charge, 0.16 gram of the lead salt of glucose nitroureide tetranitrate (product prepared by the method of Example V); and, as a flash charge, 0.06 gram of a 75/25 mixture of diazodinitrophenol and mannitol hexanitrate pressed with 25 pounds on a 0.216 inch pin. The height of the total charge was $^{42}/_{64}$ of an inch.

The loaded caps were fused in a standard fashion, primed into 1¼ x 8" sticks of a high ammonium nitrate-low nitroglycerine dynamite, and shot. Complete detonations were effected in both instances.

Ten detonators prepared over the formula of Example VI were test-fired in the standard lead plate test, resulting in 10 "A" plates. It is evident that the lead salt of glucose nitroureide tetranitrate functions satisfactorily as the primer charge in a compound detonator.

Example VII

The calcium salt of glucose nitroureide tetranitrate was employed as the base charge in preparing two compound detonators of the following construction:

Shell: Two inch Gilding metal—0.22 inch I.D.
Base charge: 0.29 gram of calcium glucose nitroureide tetranitrate pressed with 150 pounds on 0.216 inch pin.
Primer charge: 0.16 gram of mannitol hexanitrate.
Flash charge: 0.66 gram of 75/25 mixture of diazodinitrophenol and mannitol hexanitrate, pressed with 25 pounds on 0.216 inch pin.

When fused in the regular manner, primed into 1¼ x 8" sticks of high ammonia-low nitroglycerine dynamite and shot, complete detonations were obtained with both caps.

What is claimed is:
1. An aldohexose nitroureide tetranitrate.
2. Glucose nitroureide tetranitrate.
3. The salt of an aldohexose nitroureide tetranitrate, the cation of which is inorganic and has a valency no greater than 2.
4. A salt as in claim 3 wherein the said aldohexose is glucose.
5. The sodium salt of glucose nitroureide tetranitrate.
6. The calcium salt of glucose nitroureide tetranitrate.
7. The lead salt of glucose nitroureide tetranitrate.
8. The process which comprises nitrating an aldohexose ureide, separating the formed nitroureide tetranitrate from the nitrating medium and converting the said nitrate to the salt of an inorganic base, the cation of which has a valency of no greater than 2.
9. The process of preparing a heavy metal salt of an aldohexose nitroureide tetranitrate which comprises nitrating an aldohexose ureide, separating the formed aldohexose nitroureide tetranitrate from the spent nitrating medium by dilution with water and filtering, re-dissolving the precipitate by conversion to an alkali metal salt of the nitroureide in aqueous medium, adding an aqueous solution of a heavy metal salt, and recovering the precipitated salt of said aldohexose nitroureide tetranitrate.
10. The process of preparing lead glucose nitroureide tetranitrate which comprises nitrating glucose ureide with nitric-sulfuric nitrating acid, diluting the nitration charge with water, filtering the precipitated glucose nitroureide tetranitrate, dissolving in aqueous sodium carbonate solution, adding aqueous nitrate solution and recovering the precipitate lead salt of glucose nitroureide tetranitrate.
11. The process of preparing a salt of an aldohexose nitroureide tetranitrate which comprises nitrating an aldohexose ureide with nitric-sulfuric nitrating acid; diluting the nitration charge with water; filtering the precipitated aldohexose nitroureide tetranitrate; re-dissolving the precipitate in an oxygenated organic solvent; adding an excess of a solid carbonate selected from the group consisting of alkali metal, alkaline earth metal and ammonium carbonates; filtering the solution from the excess solid carbonate; evaporating the filtrate and recovering the formed salt of aldohexose nitroureide tetranitrate therefrom.
12. The process of claim 11 wherein the said aldohexose is glucose and the said carbonate is sodium carbonate.

References Cited in the file of this patent
UNITED STATES PATENTS

| | | |
|---|---|---|
| 2,039,046 | Wyler | Apr. 28, 1936 |
| 2,094,693 | Wyler | Oct. 5, 1937 |
| 2,612,497 | Meijer | Sept. 30, 1952 |
| 2,808,404 | Erickson | Oct. 1, 1957 |

OTHER REFERENCES

Reudler: Rec. Trav. Chim. 33, 35–84 (1914), reported in Chem. Abstr. 8, 2373–5 (1914).

UNITED STATES PATENT OFFICE
CERTIFICATION OF CORRECTION

Patent No. 2,969,354                       January 24, 1961

Joseph W. Lawrence et al.

It is hereby certified that error appears in the above numbered patent requiring correction and that the said Letters Patent should read as corrected below.

Column 4, line 1, for "0.66 gram" read -- 0.06 gram --.

Signed and sealed this 4th day of July 1961.

(SEAL)
Attest:

ERNEST W. SWIDER                             DAVID L. LADD
Attesting Officer                                   Commissioner of Patents